(12) United States Patent
Stiles

(10) Patent No.: US 10,970,393 B1
(45) Date of Patent: Apr. 6, 2021

(54) PROBABILISTIC SET MEMBERSHIP USING BLOOM FILTERS

(71) Applicant: Altiris, Inc., Tempe, AZ (US)

(72) Inventor: Adam J. Stiles, Altadena, CA (US)

(73) Assignee: Altiris, Inc., Tempe, AZ (US)

( * ) Notice: Subject to any disclaimer, the term of this patent is extended or adjusted under 35 U.S.C. 154(b) by 322 days.

(21) Appl. No.: 16/223,447

(22) Filed: Dec. 18, 2018

(51) Int. Cl.
*H04L 29/06* (2006.01)
*G06F 21/56* (2013.01)
*G06F 21/55* (2013.01)
*G06F 16/22* (2019.01)
*G06F 16/14* (2019.01)

(52) U.S. Cl.
CPC .......... *G06F 21/564* (2013.01); *G06F 16/152* (2019.01); *G06F 16/2255* (2019.01); *G06F 21/552* (2013.01); *G06F 21/554* (2013.01)

(58) Field of Classification Search
CPC .. G06F 21/264; G06F 16/2255; G06F 16/152; G06F 21/552; G06F 21/554
See application file for complete search history.

(56) References Cited

U.S. PATENT DOCUMENTS

| | | | | |
|---|---|---|---|---|
| 7,900,194 B1* | 3/2011 | Mankins | ................ | G06F 21/566 717/127 |
| 8,498,995 B1* | 7/2013 | Gond | .................... | G06F 16/245 707/754 |
| 8,825,678 B2* | 9/2014 | Potapov | .................. | G06F 12/00 707/754 |
| 8,850,583 B1* | 9/2014 | Nelson | ................ | H04L 63/1433 726/23 |
| 9,298,934 B1* | 3/2016 | Sang | ..................... | G06F 21/604 |
| 2006/0294311 A1* | 12/2006 | Fu | .......................... | G06F 16/951 711/118 |
| 2011/0219010 A1* | 9/2011 | Lim | ........................ | G06F 16/00 707/747 |
| 2013/0132408 A1* | 5/2013 | Little | .................. | G06F 16/2255 707/754 |
| 2013/0166576 A1* | 6/2013 | Hudzia | ............... | G06F 16/2255 707/754 |
| 2015/0039629 A1* | 2/2015 | Theeten | ................ | G06F 16/325 707/747 |
| 2019/0370374 A1* | 12/2019 | Carter | ................. | G06F 16/2255 |

OTHER PUBLICATIONS

Have I Been Pwned: API v2, https://haveibeenpwned.com/API/v2#PwnedPasswords. Accessed Dec. 26, 2018.

* cited by examiner

*Primary Examiner* — Shin-Hon (Eric) Chen
(74) *Attorney, Agent, or Firm* — Troutman Pepper Hamilton Sanders LLP; James E. Schutz; Mark Lehi Jones

(57) ABSTRACT

A method for determining whether data is included in a database is described. In one embodiment, the method may include receiving, from a remote computing device, a search request that includes a portion of a signature, comparing the portion of the signature with a plurality of signatures stored at the database, determining whether at least one match exists between the portion of the signature and the plurality of signatures, upon determining at least one match exists, identifying each match and identifying a bloom filter that includes each match, and transmitting the bloom filter to the remote computing device.

16 Claims, 7 Drawing Sheets

PROBABILISTIC SET MEMBERSHIP USING BLOOM FILTERS

BACKGROUND

Data breaches or leaks often expose large quantities of secure user data (e.g., a user password). The exposed data may result in associated accounts and/or secure information being compromised. Systems may be implemented that allow users to provide potentially-exposed user data to determine whether the particular data was subject to a breach or leak. However, providing such user data may further subject the user's information to additional data breaches or leaks.

SUMMARY

According to at least one embodiment, a method for determining whether data is included in a database is described. In one embodiment, the method may include receiving, from a remote computing device, a search request that includes a portion of a signature, comparing the portion of the signature with a plurality of signatures stored at the database, determining whether at least one match exists between the portion of the signature and the plurality of signatures, upon determining at least one match exists, identifying each match and identifying a bloom filter that includes each match, and transmitting the bloom filter to the remote computing device.

In some examples, the method may include generating the bloom filter based at least in part on a default false positive rate or a custom false positive rate indicated in the request. In some examples, the method may include generating the bloom filter dynamically after receiving the search request. In some examples, the method may include generating the bloom filter before receiving the search request based at least in part on identifying a segment from the plurality of signatures stored at the database, generating the bloom filter using the identified segment, and determining at least a part of the segment matches the portion received in the request or determining at least a part of the portion received in the request matches the segment.

In some examples, the method may include adding a new signature to the plurality of signatures in the database and updating the bloom filter generated before receiving the search request based at least in part on the adding of the new signature to the database. In some examples, the method may include including a first reference and a second reference with the bloom filter, the first reference comprising a number of matches in the bloom filter, and the second reference comprising a number of hash functions used to build the bloom filter. In some examples, the method may include upon determining no match is found between the portion of the signature and the plurality of signatures, sending a notification to the remote computing device indicating no match exists in the database.

In some examples, the method may include receiving an additional portion of the signature to reduce a number of matches in the bloom filter and comparing the combination of the additional portion and the portion of the signature with the plurality of signatures stored at the database. In some examples, the portion is generated by truncating the signature to a predefined length, wherein the predefined length is associated with a predetermined number of bits of the signature. In some examples, a number of bits in each of the plurality of signatures stored at the database are greater than the predetermined number of bits of the signature. In some examples, the portion includes at least one of a beginning portion of the signature, one or more middle portions of the signature, or an end portion of the signature, or any combination thereof.

In some examples, the method may include performing a security action based at least in part on at least one of determining the data matches one or more malware signatures in the database, determining the threat risk score satisfies a risk score threshold, determining the threat activities satisfy a threat threshold, determining the suspicious behaviors satisfy a suspicious behaviors threshold, determining the identity information of the user has been potentially stolen, or any combination thereof. In some examples, the signature and each of the plurality of signatures comprise a hash within a range of 32 bits and 32,768 bits. In some examples, the signature comprises a hash, a cryptographic hash, or a bloom filter.

A computing device configured for probabilistic set membership using prefix matching and bloom filters is also described. The computing device may include one or more processors and memory in electronic communication with the one or more processors. The memory may store computer executable instructions that when executed by the one or more processors cause the one or more processors to perform the steps of receiving, from a remote computing device, a search request that includes a portion of a signature, comparing the portion of the signature with a plurality of signatures stored at the database, determining whether at least one match exists between the portion of the signature and the plurality of signatures, upon determining at least one match exists, identifying each match and identifying a bloom filter that includes each match, and transmitting the bloom filter to the remote computing device.

A computer-program product for probabilistic set membership using prefix matching and bloom filters is also described. The computer-program product may include a non-transitory computer-readable medium storing instructions thereon. When the instructions are executed by one or more processors, the execution of the instructions may cause the one or more processors to perform the steps of receiving, from a remote computing device, a search request that includes a portion of a signature, comparing the portion of the signature with a plurality of signatures stored at the database, determining whether at least one match exists between the portion of the signature and the plurality of signatures, upon determining at least one match exists, identifying each match and identifying a bloom filter that includes each match, and transmitting the bloom filter to the remote computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
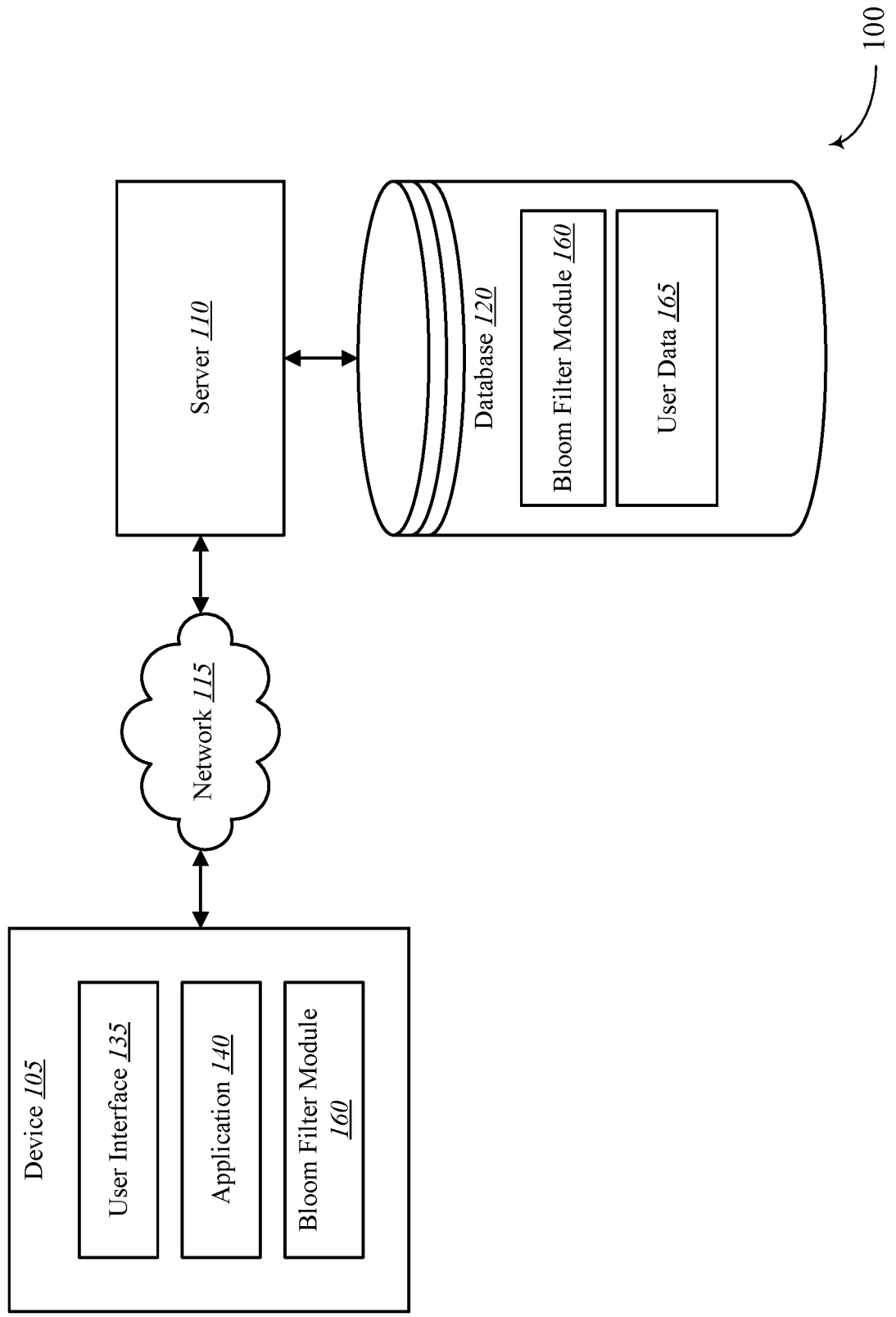
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to user data location. More specifically, the systems and methods described herein relate to allowing users to securely locate user data stored at a database by generating a user signature (e.g., a hash, a cryptographic hash, or a bloom filter of personal user data, etc.).

At times, entities maintain large databases of user data (e.g., passwords, social security numbers, credit card numbers, etc.) that have been the object of data breaches or leaks. A client of such an entity may desire to protect his/her personal information by verifying that his/her data has not been previously included in a known data breach or leak. In order to determine whether particular user data has been subject to a data breach or leak, enterprises generate a signature (e.g., a sample or portion of personal data, a hash of a portion of personal data, etc.) and submit the signature to a credit and fraud prevention web service. The web service returns an indication whether the particular user data exists in the breached dataset based on a match between the signature and the data in the database.

In some examples, a database may include a plurality of signatures that correspond to user data. In one example, each signature of the database may include a hash of user personal information. The database may include logic for interacting with the signatures (e.g., analyzing signatures received from users, etc.) such that a user may determine whether his or her personal information is stored at the database. Each signature stored to the database may be unique in that it may represent a particular piece or set of user personal information (e.g., a user name, a password, a social security number, an address, a phone number, a date of birth, a credit card number, etc.). In some examples, each signature may be or may include a signature of a certain bit size (e.g., a 256-bit signature, etc.), and each signature may be sorted in binary for ease of lookup via a binary search algorithm. In some examples, the signatures may be randomly distributed within the key space.

In order to determine whether a signature is stored at the database, a web service may provide an application programming interface (API) configured to interact with clients seeking confirmation whether their personal information was part of a data breach. Specifically, the API may allow a client to determine whether a specific signature is present in the dataset. In some examples, a client may generate a signature corresponding to a particular piece of personal data. The signature may be truncated to a specific length (e.g., by the user, by the API, and/or by the database). For example, a client may generate a signature of a certain bit size (e.g., a 256-bit hash) of at least a portion of the client's personal information, and the API may submit at least a portion of the user signature to determine whether a match exists between the user signature and the signatures in the database. In one example, the API may send one or more predetermined portions of the user signature and/or one or more randomly selected portions of the user signature. For example, the API may select a first set of bits of the user signature (e.g., the first 20 bits of a 256-bit user signature, etc.), and/or select a middle set of bits of the user signature (e.g., a middle 20 bits of the 256-bit user signature, etc.), and/or select an end set of bits of the user signature (e.g., last 20 bits of the 256-bit user signature, etc.).

Upon receiving the user signature (e.g., portion of the user signature), the API may determine whether a match exists between the signatures in the database and the user signature. Upon identifying one or more matches, the API may return (e.g., from the database) a bloom filter data file that represents the matching signatures in the underlying dataset. In some cases, at least one bloom filter data file may be pre-built before the user request or before the search is performed. Additionally or alternatively, at least one bloom filter data file be built dynamically on the fly after the user request (e.g., after a user submits at least a portion of the user signature). At least one bloom filter may be constructed using a pre-defined false positive rate. In some examples, at least one bloom filter data file may include a reference to the number of underlying items in the dataset (e.g., n) and the number of hash functions used to build the at least one bloom filter (e.g., k). Given n and k and a binary bloom filter data file, a user may determine whether the complete user signature (e.g., the complete 256-bit signature) is present in the database.

Using the prefix "aaaaa" above, in one example the database may construct a bloom filter with 478 items (e.g., n=478), 27 hash functions (e.g., k=27) and a false positive rate of 1 in 100 million. The exemplary resulting data file may be approximately 2.4 KBytes, which may be a relatively small size. The reduced size may, for example, take less time to send to a remote machine over a network etc. Further, in some examples, the resulting data file may omit the underlying hashes, which may result in increased privacy (e.g., by not disclosing unintended information to the customer).

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105, the server 110, and the database 120 to communicate with one another. In other examples, the environment 100 may include a remote device (e.g., a remote computing device) in communication with device 105

Examples of the device 105 may include any combination of mobile devices, smart phones, personal computing devices, computers, laptops, desktops, servers, media content set top boxes, or any combination thereof. In some cases, device 105 may include a bloom filter module 160 integrated within device 105, or may be in communication with a user credential location module via network 115. In some examples, device 105 may be in communication with a remote device (e.g., a remote computing device).

Examples of a remote device (e.g., a remote computing device) may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. In some examples, a remote computing device may connect to device 105 via network 115. In other examples, a remote computing device may connect directly to device 105. In some cases, device 105 may connect or attach to a remote computing device and/or server 110 via a wired and/or wireless connection. In some cases, device 105 may attach to any combination of a port, socket, and slot of computing device 150 and/or server 110.

In some configurations, the device 105 may include a user interface 135, application 140, and bloom filter module 160. Although the components of the device 105 are depicted as being internal to the device 105, it is understood that one or more of the components may be external to the device 105 and connect to device 105 through wired and/or wireless connections. In some embodiments, application 140 may be installed on a computing device (e.g., a remote computing device) in order to allow a user to interface with a function of device 105, bloom filter module 160, computing device 150, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include bloom filter module 160. For example, device 105 may include application 140 that allows device 105 to interface with a separate device via bloom filter module 160 located on another device such as a remote computing device and/or server 110. In some embodiments, device 105, remote computing device, and server 110 may include bloom filter module 160 where at least a portion of the functions of bloom filter module 160 are performed separately and/or concurrently on device 105, remote computing device, and/or server 110. Likewise, in some embodiments, a user may access the functions of device 105 (directly or through device 105 via bloom filter module 160) from a remote computing device. For example, in some embodiments, a remote computing device may include a mobile application that interfaces with one or more functions of device 105, bloom filter module 160, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly a remote computing device and/or one or more network devices such as a gateway, switch, router, intrusion detection system, etc. Database 120 may include a bloom filter module 160 and user data 165. In some examples, the bloom filter module 160 may be configured to generate one or more bloom filters based on an input received (e.g., from the device 105) and/or the user data 165.

As one example, device 105 (e.g., bloom filter module 160) may determine whether particular user data is stored at database 120 (e.g., as part of user data 165) over network 115 via server 110.

As described above, bloom filter module 160 may enable a user to determine whether particular user data is stored at database 120. In some embodiments, bloom filter module 160 may be configured to perform the systems and methods described herein in conjunction with user interface 135 and application 140. User interface 135 may enable a user to interact with, control, and/or program one or more functions of bloom filter module 160. Further details regarding the bloom filter module 160 are discussed below.

Figure 2:
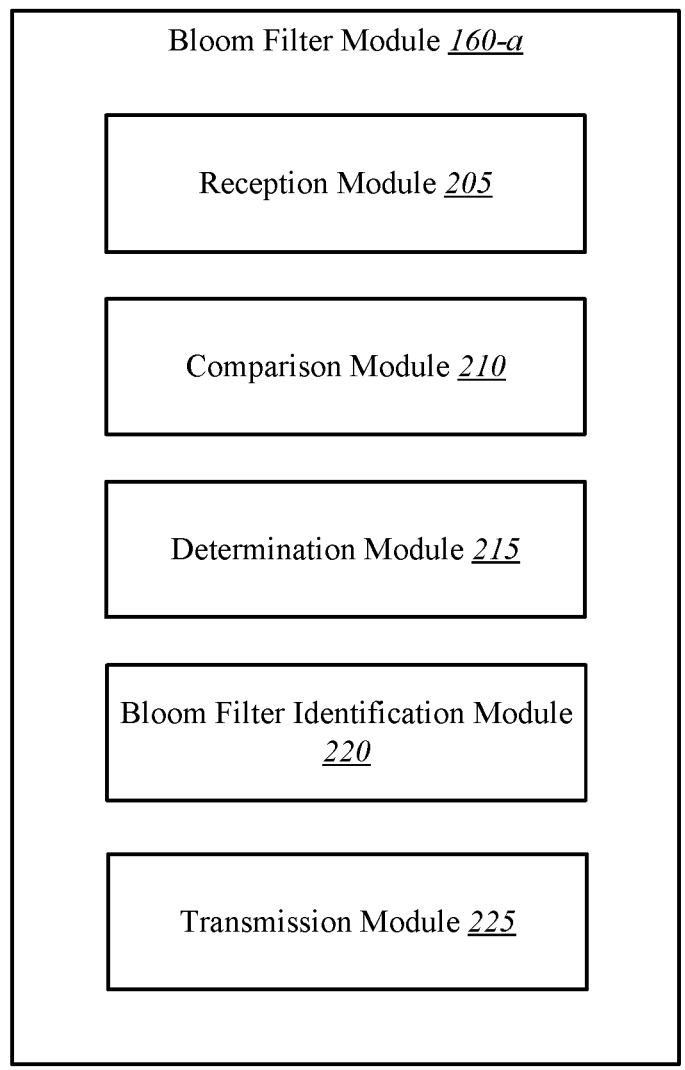
FIG. 2 is a block diagram illustrating one example of a bloom filter module.

FIG. 2 is a block diagram illustrating one example of a bloom filter module 160-*a*. The bloom filter module 160-*a* may be one example of a bloom filter module 160 depicted in FIG. 1. As depicted, bloom filter module 160-*a* may include reception module 205, comparison module 210, determination module 215, bloom filter identification module 220, and transmission module 225.

The reception module 205 may receive, from a remote device (e.g., from a remote computing device), a search request that includes at least a portion of a signature. As described herein, a signature may be received in order to determine whether user data (e.g., at least one of a user name, a password, a social security number, an address, a phone number, a date of birth, a credit card number, etc.) is stored at the database. In some examples, the signature may be or may represent user data provided to reception module 205. The reception module 205 may receive the user data and may generate the signature, which may be a cryptographic hash. In other examples, the signature may be or may include a user name, an IP address, a malware signature, a threat risk score associated with a machine or user, threat activities associated with the machine or the user, suspicious behaviors associated with the machine or the user, identity information associated with the user, or a combination thereof.

Upon receiving the search request and generating the signature, the reception module 205 may truncate the signature to a predefined length. In some examples, the reception module 205 may select a predetermined number of bits from the signature. The predetermined number of bits may correspond to a beginning portion, one or more middle portions, or an end portion of the complete signature (e.g., a set of 1 or more starting bits, and/or a set of 1 or more middle bits, and/or a set of 1 or more last bits of a signature such as a 256-bit signature, etc.). In some examples, a user may indicate to the reception module 205 a size or location, or both size and location, of the signature to use. In some embodiments, the reception module 205 may select the size and/or location of the portion of the signature. In some cases, the reception module 205 may select the portion from two or more locations of the signature. In some cases, reception module 205 may randomly select a size of a portion of the signature, randomly select a number of portions, etc. Additionally or alternatively, the selected portion may include a non-contiguous portion of bits of the signature. The truncated signature may be used for determining whether the corresponding user data is stored at the database. In some examples, reception module 205 may generate the user signature (e.g., a hash, a cryptographic hash, or a bloom filter (e.g., cryptographic long-term key), etc.), autonomously select a portion of the signature, and send the selected portion in the comparison module 210. In some cases, only a computing device on which the full signature is generated has access to the full untruncated version of the signature. For example, in some cases, reception module 205 on device 105 may send the truncated portion of the signature to a remote computing device (e.g., server 110), and in some cases only device 105 may have access to the full, untruncated signature generated on device 105.

The comparison module 210 may compare the portion of the signature with a plurality of signatures stored at a database. As described above with reference to FIG. 1, database 120 may include user data 165 that includes a plurality of personal information, such as user passwords, social security numbers, user names, IP addresses, malware files, and the like. Each piece of the plurality of user data may be associated with a unique signature. In some examples, a singular item of user data at the database may hashed (e.g., stored as a signature). Thus, in some examples, the comparison module 210 may compare the portion of the signature received by the reception module 205 with each of the plurality of signatures stored at database 120.

The determination module 215 may determine whether at least one match exists between the portion of the signature and the plurality of signatures stored at the database. The determination may be made based in part on a portion of the signature received by the reception module 205 matching a same portion (e.g., a same 20-bits) of one or more signatures stored at the database. In some examples, the determination may indicate (e.g., to the device 105 as described with reference to FIG. 1) that one or more security actions are to be performed. For example, the portion of the signature may be or may represent a threat risk score, a threat activity, and/or a suspicious behavior threshold. Accordingly, determining that a match exists between the portion of the signature and the plurality of signatures stored at the database may trigger a security action at the device. In some examples, determining that a match exists between the portion of the signature and the plurality of signatures stored at the database may indicate to the device that a threat risk score satisfies a risk score threshold, the threat activities satisfy a threshold, and/or that suspicious behaviors satisfy a suspicious behavior threshold.

The bloom filter identification module 220 may identify each match (e.g., each match between a portion of the signature received by reception module 205 and a signature previously stored at the database) and may identify a bloom filter that includes each match. A bloom filter may be or may be an example of a space-efficient probabilistic data structure that may test whether a given element (e.g., a portion of a signature) is a member of a data set. The bloom filter may indicate whether a given element may be a part of the data set, and/or whether the given element is not a part of the data set. In some cases, a bloom filter may result in false positive matches, but not false negative matches.

In some examples, the bloom filter identification module 220 may identify and/or generate a bloom filter based on the portion of the signature received by the reception module 205. An empty bloom filter may be made up of a predefined number of bits (e.g., m bits), which may be associated with a total number of objects in the array. For example, m may represent a total number of signatures stored to the bloom filter. A predefined false positive rate (e.g., 1 in 100 million) may be selected by a user (e.g., via the bloom filter module 160-a) or may be predefined. In some examples, a request by a user may indicate a probability of a false positive. For example, the request may include a fraction between 0 and 1 or a number indicating 1-in-p, etc. Based on the false positive rate, a number of hash functions (e.g., k hash functions) may be used by the bloom filter. Each hash function may map to one or more m array positions, which may generate a uniform random distribution. Accordingly, to query whether an element is part of the entire data set, the element may be applied to each hash function, and may subsequently be compared to the corresponding m array position(s). If any one of the bits do not match, then the element is not contained in the set. However, if each of the bits match then the element may be included in the set (e.g., based on the false positive rate).

Thus, the bloom filter identification module 220 may first identify each match between a portion of the signature (e.g., received by the reception module 205) and the plurality of signatures stored at the database. The bloom filter identification module 220 may then, based on the false positive rate, apply the portion of the signature to each hash function. If any one of the resulting bits do not match the corresponding bits in the array, then the user data associated with the portion of the signature is not contained in the set. However, if each of the bits match then the associated user data may be included in the set (e.g., according to a probability determined by the false positive rate).

The transmission module 225 may transmit the bloom filter to the user based on a result of identifying the bloom filter (e.g., by bloom filter identification module 220). The bloom filter may be transmitted to the device using k-anonymity features. In some examples, a user may receive from transmission module 225 an indication on a device of whether his or her user data is stored at the server, without receiving the actual user data stored at the server. In some cases, the bloom filter data file may include a reference to the number of underlying items (e.g., number of matches) in the database. As indicated, the number of matches may be indicated by a value n, while the number of hash functions used to build the bloom filter may be indicated by a value k. In some case, given n and k, and a binary bloom filter data file, a customer can determine whether the complete 256-bit signature is present in the IDA dataset. Thus, the transmission module 225 may transmit the corresponding bloom filter to the user (e.g., to a user device), and the user may determine that his or her user data is stored at the database.

Figure 3:
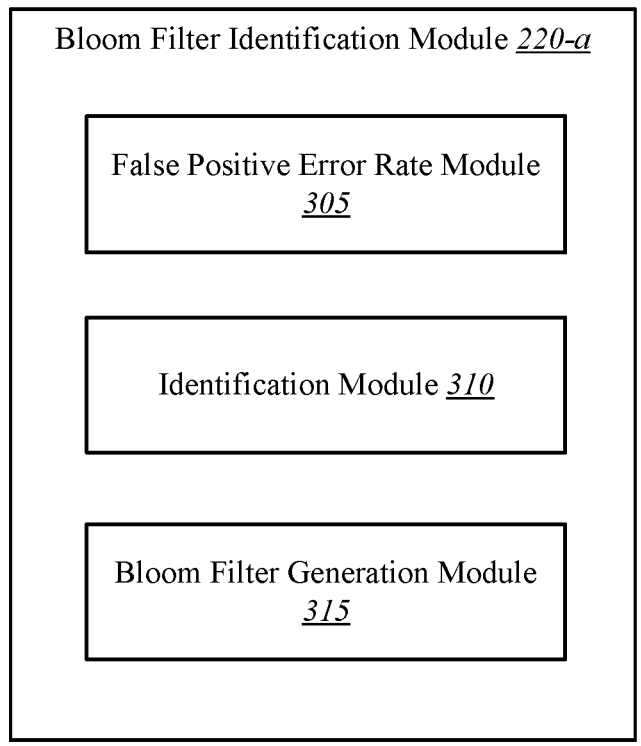
FIG. 3 is a block diagram illustrating one example of a bloom filter identification module.

FIG. 3 is a block diagram illustrating one example of a bloom filter identification module 220-a. Bloom filter identification module 220-a may be one example of a bloom filter identification module 220 as depicted in FIG. 2. As depicted, bloom filter identification module 220-a may include a false positive rate module 305, an identification module 310, and a bloom filter generation module 315.

In some examples, the bloom filter identification module 220 as described above with reference to FIG. 2 may identify and/or generate a bloom filter based on the portion of the signature received by the reception module 205. Accordingly, the components of the bloom filter identification module 220-a may perform one or more operations that may identify and/or generate a bloom filter based on a portion of a signature received (e.g., by the reception module 205 as described with reference to FIG. 2). For example, the false positive rate module 305 may facilitate the selection of the predefined false positive rate (e.g., 1 in 100 million) that may be used in identifying and/or generating the bloom filter. In some examples, the false positive rate module 305 may receive a selection of a false positive rate from a user. Additionally or alternatively, the false positive rate module 305 may select the false positive rate based on a predefined value. For example, the false positive rate may be 1 in 1 million, which may indicate the probability of falsely indicating a match exists when it actually does not. In the present techniques, there are no false negatives (e.g., falsely indicating a match does not exist when a match actually does exist.) Thus an increased false positive rate may result in a larger bloom filter being transmitted to a user. In some examples, a larger false positive rate (e.g., 1 in 1 billion compared to 1 in 1 million) may result in a data file having greater accuracy, but a larger size as a result.

In some examples, the identification module 310 may identify a pre-generated bloom filter based on a determination that a match exists between the portion of the signature and the plurality of signatures stored at the database. For example, a bloom filter may be generated (e.g., pre-generated) based on a user-selected or predefined false positive rate. A portion of a signature that includes "aaaa" may be submitted to the database. Accordingly, the database may determine that at least one of the plurality of stored signatures also includes "aaaa." Thus, based on a pre-generated bloom filter, the identification module 310 may identify the bloom filter (and corresponding hash functions, k) to apply the portion of the signature to.

The bloom filter generation module 315 may be configured to generate one or more bloom filters (e.g., dynamically or based on one or more predefined characteristics). As discussed herein, an empty bloom filter may be made up of a predefined number of bits (e.g., m bits). Based on the false positive rate, a number of hash functions (e.g., k) may be used by the bloom filter. Each hash function may map to one or more m array positions, which may generate a uniform random distribution. Thus, the bloom filter generation module 315 may generate a bloom filter having a number of hash functions, and may apply each portion of the signature to each hash function. If any one of the bits do not match, then the element is not contained in the set. However, if each of the bits match then the element may be included in the set (e.g., based on the false positive rate).

In some cases, bloom filter generation module 315 may build multiple bloom filters before receiving the request. For example, bloom filter generation module 315 may build multiple bloom filters based on various combinations of matching segments among the plurality of signatures (e.g., hash, cryptographic hash, bloom filter, etc.). For instance, a segment from at least a first signature from the plurality of signature may match a segment from a second signature from the plurality of signatures. For example, at least the first signature and the second signature may include the segment "A1C3E." Accordingly, bloom filter generation module 315 may generate a bloom filter based on the segment "A1C3E." Subsequently, bloom filter generation module 315 may receive a request with a portion of a full signature (e.g., a cryptographic hash generated on a remote computing device, etc.), where the truncated portion is "A1C3E." Accordingly, bloom filter generation module 315 may receive the request and then determine whether a bloom filter has already been generated for a segment that matches the portion from the request. Upon identifying the bloom filter generated for a segment that matches the portion from the request (e.g., A1C3E), bloom filter generation module 315 may bypass dynamically generating a new bloom filter, and may instead send the pre-generated bloom filter in a response to the request. In some cases, bloom filter generation module 315 may update each pre-generated bloom filter upon determining the database has been updated.

In some examples, the bloom filter generation module 315 may generate the bloom filter based on a default false positive rate or a custom false positive rate identified (e.g., by a user) in the request. For example, either a default false positive rate or a custom false positive rate may be implemented. The bloom filter generation module 315 may generate the bloom filter dynamically (e.g., after receiving the search request). In other examples, the bloom filter may be pre-generated, and every search request entered into identified by bloom filter module 160 may use the same, pre-generated bloom filter. Additionally or alternatively, the bloom filter generation module 315 may generate the bloom filter before receiving the search request based at least in part on identifying a segment from the plurality of signatures stored at the database.

In some examples the bloom filter module 160-a as described with reference to FIG. 2 may perform multiple iterations given a single portion of a signature. In some examples, a portion of a signature may be applied to a bloom filter multiple times in order to determine whether the associated user data is stored at the database. For example, the bloom filter generation module 315 may generate a bloom filter and apply the portion of the signature to each associated hash function. The bloom filter may be generated using a first false positive rate. In some examples, the bloom filter generation module 315 may subsequently generate (e.g., update) a bloom filter and apply the portion of the signature to each associated hash function. The bloom filter may be generated (e.g., updated) using a second false positive rate that is different than the first false positive rate. Accordingly, by utilizing multiple false positive rates, it may be determined whether the user data is stored at the database with increased accuracy.

Additionally or alternatively, new signatures may be added to the database. For example, the database may receive updated user data and may store associated updated signatures. In some examples, the bloom filter generation module 315 may add the new signatures to the plurality of signatures in the database. The bloom filter generation module 315 may then update the bloom filter generated based on adding the new signatures to the database.

Figure 4:
FIG. 4 is a swim diagram that supports probabilistic set membership using prefix matching and bloom filters.

FIG. 4 is a swim diagram 400 that supports probabilistic set membership using prefix matching and bloom filters. In some examples, swim diagram 400 may implement aspects of environment 100. In some configurations, the diagram 400 may be associated with a device 105-a and database 120-a. In some examples, device 105-a may be an example of device 105 as described with respect to FIG. 1, and database 120-a may be an example of database 120 as described with respect to FIG. 1. In some configurations, the steps depicted by the swim diagram 400 may be implemented in conjunction with server 110, network 115, components thereof, or any combination thereof. In some cases, aspects of diagram 400 may be implemented by and/or in conjunction with bloom filter module 160. In some examples, device 105-a may be referred to as a user device and may be associated with a user seeking to determine whether user data is stored at database 120-a.

At block 405, the device 105-a may generate a signature based on user input. Thus the device 105-a may prompt a user for particular user data (e.g., a credential) to be hashed and/or truncated before being transmitted to the database 120-a. For example, device 105-a may prompt a user for at least one of a user name or a password.

At block 410, the signature may be truncated (e.g., create a truncated version of the full signature such as a 30-bit truncated signature from a 512-bit full signature, etc.). In some cases, bloom filter module 160 may create the truncated signature. In some cases, a user may designate how many bits to use for the truncated signature. For example, a user may designate 24 bits. In some examples, bloom filter module 160 may select the number of bits for the truncated signature based on a predetermined number of bits or a random number of bits. In some cases, a user may designate sets of bits such as a set of starting bits, and/or a set of middle bits, and/or a set of end bits from the full signature to create the truncated signature. For example, a user may designate 10 starting bits from the start of the full signature, and/or 10 middle bits from the start of the full signature, and/or 10 end bits from the end of the full signature. In some cases, bloom filter module 160 may randomly pick one or more sets of bits from the start, and/or middle, and/or end of the full signature to create the truncated signature.

At 415 a search request may be transmitted from the device 105-*a* to the database 120-*a* that includes the truncated signature. In some cases, the search request may include a false positive rate selected by a user or by bloom filter module 160 (e.g., bloom filter module 160 uses a default false positive rate when a user does not designate the false positive rate, etc.).

In the illustrated example, the database 120-*a* may receive a search request that includes the truncated signature. The search request may be received from the device 105-*a*. In some examples, the portion of the signature may be generated at block 405 based on user input.

At step 420, the database 120-*a* may compare the truncated signature received with a plurality of signatures stored at database 120-*a*. In some cases, comparison module 210 may perform the comparison on database 120-*a*. For example, the portion of the signature received at the database 120-*a* may include "aaaa," which may be a portion of a full signature. In some examples, the database 120-*a* may compare "aaaa" across the entire portion of each stored signature.

At block 425, database 120-*a* may determine whether at least one match exists between the portion of the signature and the plurality of signatures. Using the example described above, the database 120-*a* may determine whether the prefix "aaaa" matches any prefixes of the signatures stored at the database 120-*a*. For example, a portion of a first full signature from the plurality of signatures stored at the database 120-*a* may include the string "1a19e1f3dce3aaaa27bd5." Upon identifying "aaaa" from the truncated signature in the portion "1a19e1f3dce3aaaa27bd5" from the first full signature, comparison module 210 may identify this first full signature as a match to the truncated signature received at 415. Accordingly, the first full signature or an indication of the first full signature may be included in a bloom filter sent to the requesting device (e.g., the bloom filter at 445, etc.).

In some examples, at block 430, the database 120-*a* may generate a bloom filter. As described herein, the bloom filter may be generated after the request at 415 and/or before the request at 415. For example, bloom filter module 160 may build one or more bloom filters based on commonly used character sequences of truncated signatures in search requests and/or on a probability of character sequences used in truncated signatures. In some cases, the bloom filter may be generated based on a specified false positive rate (e.g., indicated in the request at 415). In some cases, the bloom filter may be generated based on a default false positive rate.

At block 435, the bloom filter may be updated based on adding one or more full signatures to the plurality of signatures stored at the database 120-*a*. In some examples, additional personal information may be stored to the database 120-*a* and, subsequently, bloom filters that include matches or associations with signatures corresponding to the additional personal information may be updated accordingly.

At block 440, a bloom filter may be identified by the database 120-*a*. As described herein, the bloom filter may be identified or generated based on matches between a truncated signature from the request at 415 and the plurality of signatures stored at the database 120-*a*.

At 445, one or more identified/generated bloom filter may be sent to device 105-*a*. The bloom filter at 445 may indicate whether one or more matches exist between the truncated signature from 415 and the plurality of signatures stored at the database 120-*a*.

In some cases, device 105-*a*, in conjunction with bloom filter module 160, may be configured to determine whether personal information associated with the truncated signature is stored at the database 120-*a* based on the information in the bloom filter. In some cases, a bloom filter data file may be transmitted to the device 105-*a* and may be configured in a manner such that the device 105-*a* may determine whether the truncated signature matched portions of the plurality of signatures stored on the database 120-*a*.

In some examples, at block 450, bloom filter module 160 may perform a security action based on whether the bloom filter at 445 indicates existing matches. In some examples, the security action may be performed based on determining the matches indicate the truncated signature is associated with malware, determining the matches indicate a threat risk score satisfies a risk score threshold, determining the matches indicate threat activities satisfy a threat threshold, determining the matches indicate suspicious behaviors satisfy a suspicious behaviors threshold, determining the matches indicate identity information of the user has been potentially stolen, or any combination thereof. For example, the database may include stolen data and one of the plurality of signatures (e.g., cryptographic hashes) stored at the database may include at least a portion of the stolen identity information of the user. In some cases, the request may determine that the stolen information in the database includes at least the portion of the user's identity information, etc.

Figure 5:
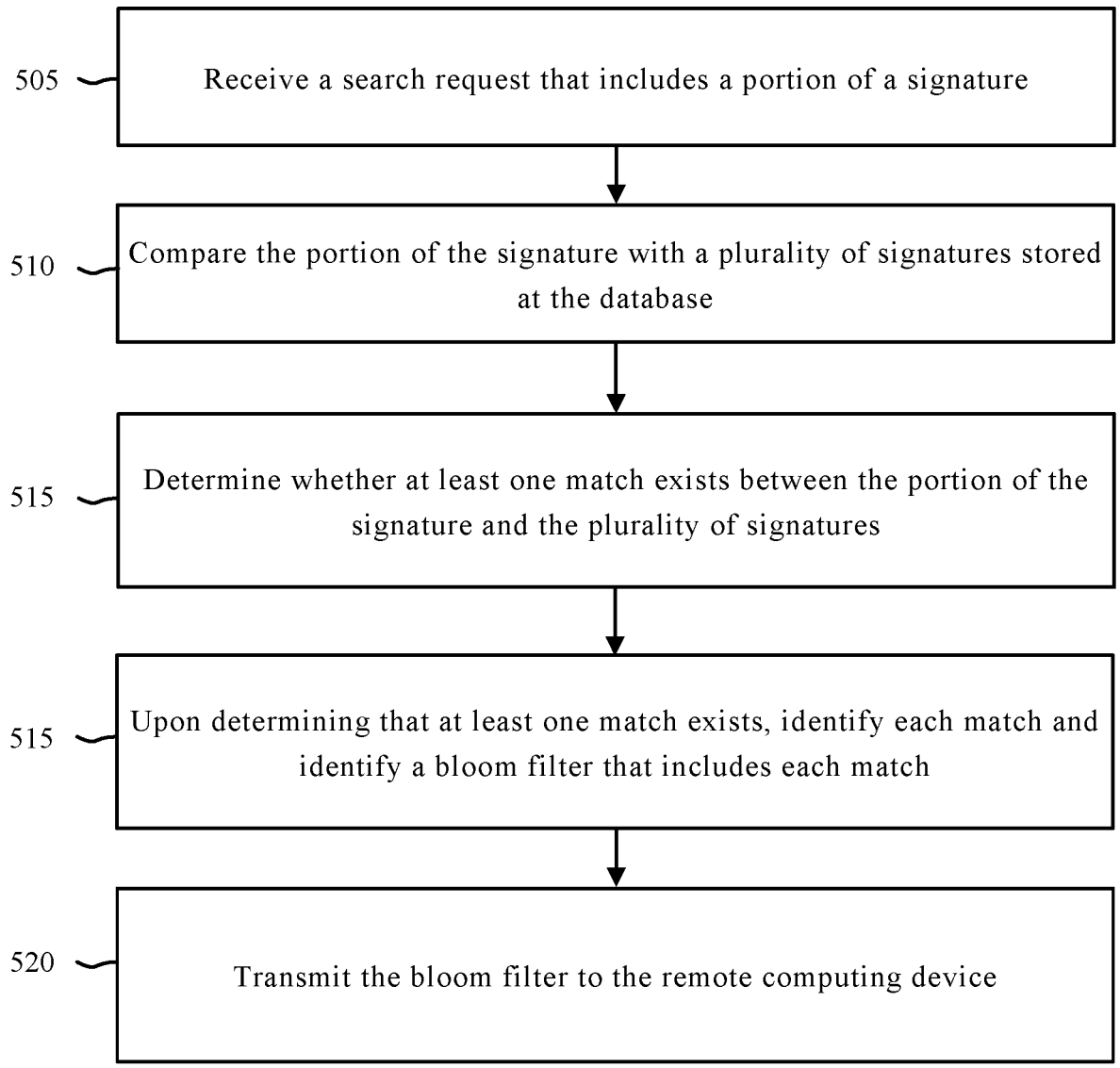
FIG. 5 is a flow diagram illustrating one embodiment of a method in accordance with various aspects of this disclosure.

FIG. 5 is a flow diagram illustrating one embodiment of a method 500 for probabilistic set membership using prefix matching and bloom filters. In some configurations, the method 500 may be implemented by the bloom filter module 160 illustrated in FIG. 1 or 2. In some configurations, the method 500 may be implemented in conjunction with device 105, server 110, network 115, database 120, components thereof, or any combination thereof.

At block 505, the method 500 may include receiving a search request that includes a portion of a signature. At block 510, the method 500 may include comparing the portion of the signature with a plurality of signatures stored at a database. At block 515, the method 500 may include determining whether at least one match exists between the portion of the signature and the plurality of signatures in the database.

At block 520, upon determining at least one match exists, the method 500 may include identifying each match and identifying a bloom filter that includes each match. In some cases, each match may include each signature in the database that includes a portion that matches the portion of the signature received at 505 (e.g., a portion of a first signature in the database that matches the portion of the signature received at 505, a portion of a second signature in the database that matches the portion of the signature received at 505, etc.). In some cases, the block 520 may include generating a bloom filter that includes each match. At block 525, the method 500 may include transmitting the bloom filter to the remote computing device.

Figure 6:
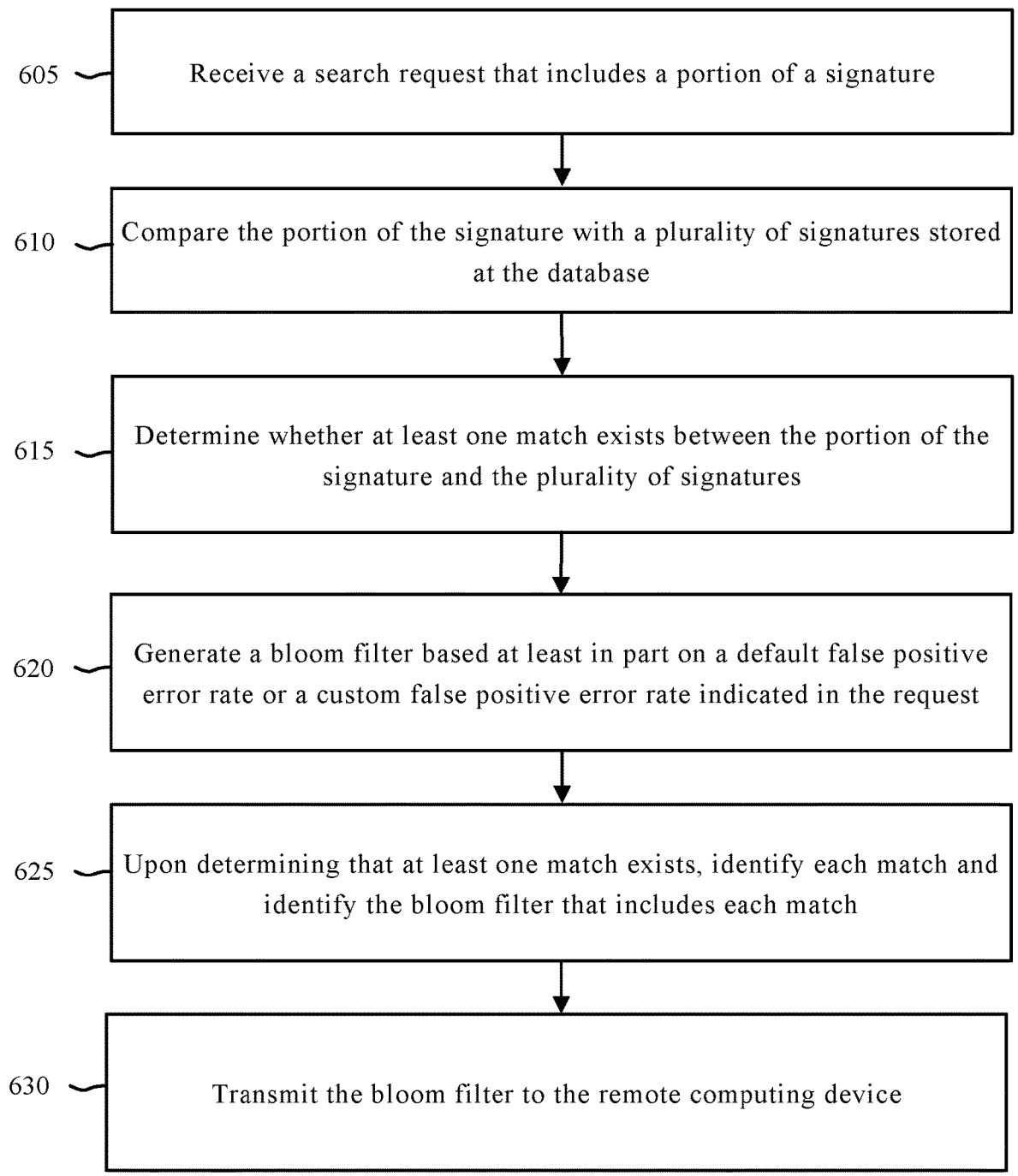
FIG. 6 is a flow diagram illustrating one embodiment of a method in accordance with various aspects of this disclosure.

FIG. 6 is a flow diagram illustrating one embodiment of a method 600 for probabilistic set membership using prefix matching and bloom filters. In some configurations, the method 600 may be implemented by the bloom filter module 160 illustrated in FIG. 1 or 2. In some configurations, the method 600 may be implemented in conjunction with device 105, server 110, network 115, database 120, components thereof, or any combination thereof.

At block 605, the method 600 may include receiving a search request that includes a portion of a signature. At block 610, the method 600 may include comparing the portion of the signature with a plurality of signatures stored at the database. At block 615, the method 600 may include determining whether at least one match exists between the portion of the signature and the plurality of signatures.

At block 620, the method 600 may include generating the bloom filter based at least in part on a default false positive rate or a custom false positive rate indicated in the request. At block 625, the method 600 may include, upon determining at least one match exists, identifying each match and identifying or generating a bloom filter that includes each match. At block 630, the method 600 may include transmitting the bloom filter to the remote computing device.

In some examples, the method 500 as described with reference to FIG. 5 and/or the method 600 as described with reference to FIG. 6 may include generating the bloom filter dynamically after receiving the search request. In some examples, the method may include generating the bloom filter before receiving the search request based at least in part on identifying a segment from the plurality of signatures stored at the database, generating the bloom filter using the identified segment, and determining at least a part of the segment matches the portion received in the request or determining at least a part of the portion received in the request matches the segment. In some examples, the method may include adding a new signature to the plurality of signatures in the database and updating the bloom filter generated before receiving the search request based at least in part on the adding of the new signature to the database.

In some examples, the method 500 as described with reference to FIG. 5 and/or the method 600 as described with reference to FIG. 6 may include including a first reference and a second reference with the bloom filter, the first reference comprising a number of matches in the bloom filter, and the second reference comprising a number of hash functions used to build the bloom filter. In some examples, the method may include, upon determining no match is found between the portion of the signature and the plurality of signatures, sending a notification to the remote computing device indicating no match exists in the database. In some examples, the method may include receiving an additional portion of the signature to reduce a number of matches in the bloom filter and comparing the combination of the additional portion and the portion of the signature with the plurality of signatures stored at the database.

In some examples, such as the method 500 as described with reference to FIG. 5 and/or the method 600 as described with reference to FIG. 6, the portion is generated by truncating the signature to a predefined length, wherein the predefined length is associated with a predetermined number of bits of the signature. In some examples, a number of bits in each of the plurality of signatures stored at the database are greater than the predetermined number of bits of the signature. In some examples, the portion includes at least one of a beginning portion of the signature, one or more middle portions of the signature, or an end portion of the signature, or any combination thereof. In some examples, the data comprises at least one of a user name, a password, an IP address, a malware signature, a threat risk score associated with a machine or user, threat activities associated with the machine or the user, suspicious behaviors associated with the machine or the user, identity information associated with the user, or a combination thereof.

In some examples, the method 500 as described with reference to FIG. 5 and/or the method 600 as described with reference to FIG. 6 may include performing a security action based at least in part on at least one of determining the data matches one or more malware signatures in the database, determining the threat risk score satisfies a risk score threshold (e.g., exceeds a risk score threshold), determining the threat activities satisfy a threat threshold (e.g., exceeds a threat threshold), determining the suspicious behaviors satisfy a suspicious behaviors threshold (e.g., exceeds a suspicious behaviors threshold), determining the identity information of the user has been potentially stolen, or any combination thereof. In some examples, the signature and each of the plurality of signatures comprise a hash within a range of 32 bits and 32,768 bits (e.g., a hash generated by a user as a signature to be tested may be sized to be equal to the sizes of each hash or each signature in the database). In some examples, the signature comprises a hash, a cryptographic hash, or a bloom filter.

Figure 7:
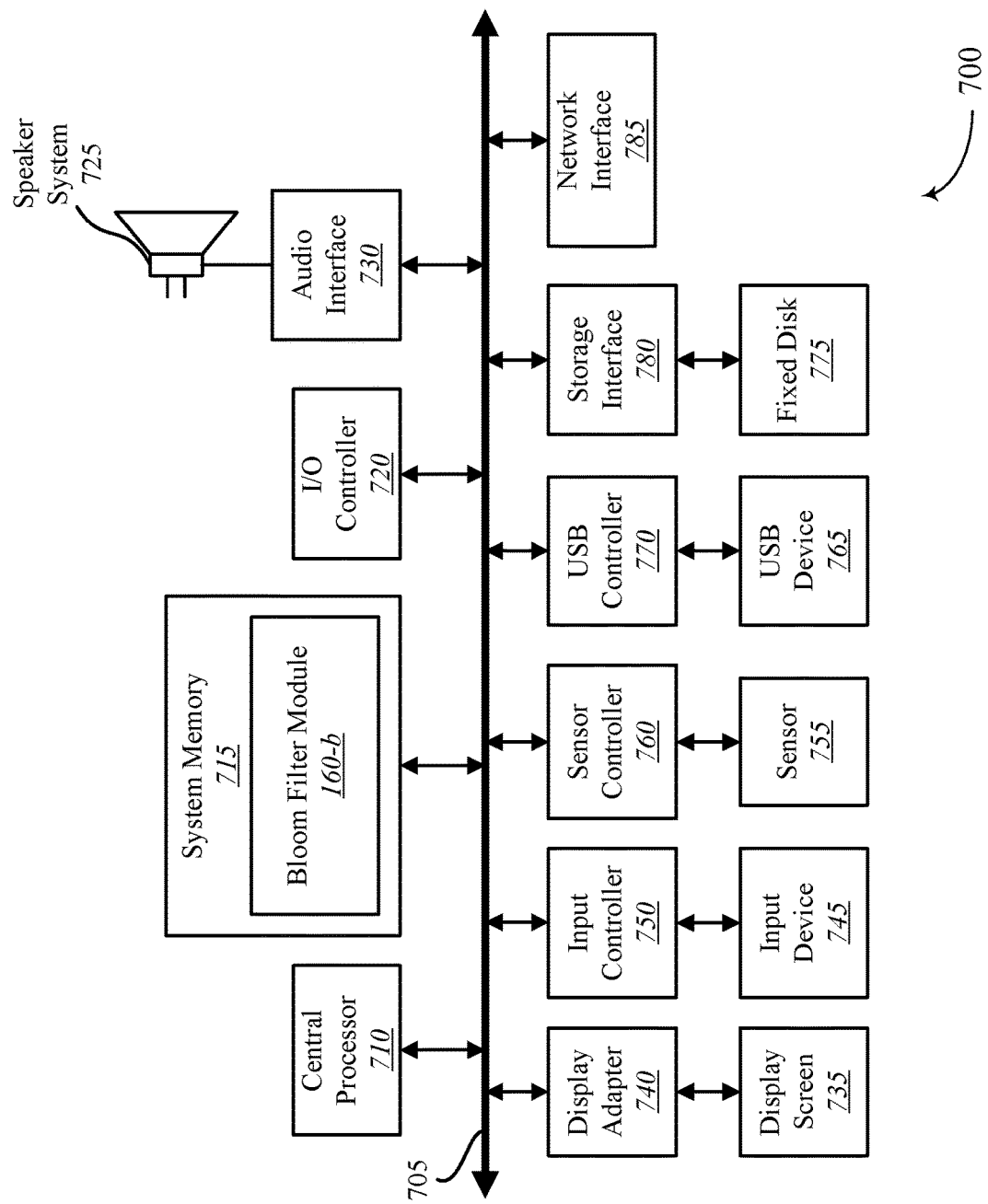
FIG. 7 depicts a block diagram of a computer system suitable for implementing the present systems and methods.

FIG. 7 depicts a block diagram of a computing device 700 suitable for implementing the present systems and methods. The computing device 700 may be an example of device 105 and/or server 110 illustrated in FIG. 1. In one configuration, computing device 700 includes a bus 705 which interconnects major subsystems of computing device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the bloom filter module 160 to implement the present systems and methods may be stored within the system memory 715. Applications (e.g., application 140) resident with computing device 700 are generally stored on and accessed via a non-transitory computer readable medium, such as a hard disk drive (e.g., fixed disk drive 775) or other storage medium. Additionally, applications can be in the form of electronic signals modulated in accordance with the application and data communication technology when accessed via network interface 785.

Storage interface 780, as with the other storage interfaces of computing device 700, can connect to a standard computer readable medium for storage and/or retrieval of information, such as a fixed disk drive 775. Fixed disk drive 775 may be a part of computing device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computing device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk drive 775. The operating system provided on computing device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computing device 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable computing device 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable computing device 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for determining whether data is included in a database, at least a portion of the method being performed by one or more computing devices, each comprising at least one processor, the method comprising:
receiving, from a remote computing device, a search request that includes a portion of a signature;
comparing the portion of the signature with a plurality of signatures stored at the database;
determining whether at least one match exists between the portion of the signature and the plurality of signatures;
upon determining at least one match exists, identifying each match and identifying a bloom filter that includes each match, wherein the bloom filter is generated before receiving the search request based at least in part on (a) identifying a segment from the plurality of signatures stored at the database, (b) generating the bloom filter using the identified segment, and (c) determining at least a part of the segment matches the portion received in the request or determining at least a part of the portion received in the request matches the segment; and
taking a security action based at least in part on determining the data matches one or more malware signatures in the bloom filter; and
transmitting the bloom filter to the remote computing device.

2. The method of claim 1, further comprising:
generating the bloom filter based at least in part on a default false positive rate or a custom false positive rate indicated in the request.

3. The method of claim 1, further comprising:
adding a new signature to the plurality of signatures in the database; and
updating the bloom filter generated before receiving the search request based at least in part on the adding of the new signature to the database.

4. The method of claim 1, further comprising:
including a first reference and a second reference with the bloom filter, the first reference comprising a number of matches in the bloom filter, and the second reference comprising a number of hash functions used to build the bloom filter.

5. The method of claim 1, further comprising:
upon determining no match is found between the portion of the signature and the plurality of signatures, sending a notification to the remote computing device indicating no match exists in the database.

6. The method of claim 1, further comprising:
receiving an additional portion of the signature to reduce a number of matches in the bloom filter; and
comparing the combination of the additional portion and the portion of the signature with the plurality of signatures stored at the database.

7. The method of claim 1, wherein the portion is generated by truncating the signature to a predefined length, wherein the predefined length is associated with a predetermined number of bits of the signature.

8. The method of claim 7, wherein a number of bits in each of the plurality of signatures stored at the database are greater than the predetermined number of bits of the signature.

9. The method of claim 1, wherein the portion includes at least one of a beginning portion of the signature, one or more middle portions of the signature, or an end portion of the signature, or any combination thereof.

10. The method of claim 1, wherein the data comprises at least one of a user name, a password, an IP address, a malware signature, a threat risk score associated with a machine or user, threat activities associated with the machine or the user, suspicious behaviors associated with the machine or the user, identity information associated with the user, or a combination thereof.

11. The method of claim 10,
wherein the security action is further based at least in part on at least one of determining the threat risk score satisfies a risk score threshold, determining the threat activities satisfy a threat threshold, determining the suspicious behaviors satisfy a suspicious behaviors threshold, determining the identity information of the user has been potentially stolen, or any combination thereof.

12. The method of claim 1, wherein the signature and each of the plurality of signatures comprise a hash within a range of 32 bits and 32,768 bits.

13. The method of claim 1, wherein the signature comprises a hash, a cryptographic hash, or a bloom filter.

14. A computing device configured for determining whether data is included in a database, comprising:
a processor;
memory in electronic communication with the processor, wherein the memory stores computer executable instructions that when executed by the processor cause the processor to perform the steps of:
receive, from a remote computing device, a search request that includes a portion of a signature;
compare the portion of the signature with a plurality of signatures stored at the database;
determine whether at least one match exists between the portion of the signature and the plurality of signatures;
upon determining at least one match exists, identify each match and identifying a bloom filter that includes each match, wherein the bloom filter is generated before receiving the search request based at least in part on (a) identifying a segment from the plurality of signatures stored at the database, (b) generating the bloom filter using the identified segment, and (c) determining at least a part of the segment matches the portion received in the request or determining at least a part of the portion received in the request matches the segment;

taking a security action based at least in part on determining the data matches one or more malware signatures in the bloom filter; and transmit the bloom filter to the remote computing device.

15. The computing device of claim 14, wherein the instructions are executable by the processor to:

generate the bloom filter based at least in part on a default false positive rate or a custom false positive rate indicated in the request.

16. A non-transitory computer-readable storage medium storing computer executable instructions that when executed by a processor cause the processor to perform the steps of:

receiving, from a remote computing device, a search request that includes a portion of a signature;

comparing the portion of the signature with a plurality of signatures stored at a database;

determining whether at least one match exists between the portion of the signature and the plurality of signatures;

upon determining at least one match exists, identifying each match and identifying a bloom filter that includes each match, wherein the bloom filter is generated before receiving the search request based at least in part on (a) identifying a segment from the plurality of signatures stored at the database, (b) generating the bloom filter using the identified segment, and (c) determining at least a part of the segment matches the portion received in the request or determining at least a part of the portion received in the request matches the segment; and taking a security action based at least in part on determining that the portion of the signature matches one or more malware signatures in the bloom filter; and transmitting the bloom filter to the remote computing device.

* * * * *